US009673675B2

(12) United States Patent
Lucchi (10) Patent No.: US 9,673,675 B2
(45) Date of Patent: Jun. 6, 2017

(54) STATOR OF AN AXIAL FLOW ELECTRIC MACHINE AND THE PROCESS FOR MAKING IT

(71) Applicant: LUCCHI R. ELETTROMECCANICA S.R.L., Rimini (IT)

(72) Inventor: Fabio Lucchi, Rimini (IT)

(73) Assignee: LUCCHI R. ELETTROMECCANICA S.R.L., Rimini (IT)

( * ) Notice: Subject to any disclaimer, the term of this patent is extended or adjusted under 35 U.S.C. 154(b) by 794 days.

(21) Appl. No.: 14/105,987

(22) Filed: Dec. 13, 2013

(65) Prior Publication Data

US 2014/0175933 A1   Jun. 26, 2014

(30) Foreign Application Priority Data

Dec. 20, 2012   (IT) .............. RN2012A0057

(51) Int. Cl.
| | |
|---|---|
| *H02K 1/12* | (2006.01) |
| *H02K 3/28* | (2006.01) |
| *H02K 3/46* | (2006.01) |
| *H02K 15/02* | (2006.01) |
| *H02K 15/12* | (2006.01) |
| *H02K 15/04* | (2006.01) |
| *H02K 1/14* | (2006.01) |

(52) U.S. Cl.
CPC .............. *H02K 3/28* (2013.01); *H02K 1/141* (2013.01); *H02K 1/148* (2013.01); *H02K 3/46* (2013.01); *H02K 15/022* (2013.01); *H02K 15/0435* (2013.01); *H02K 15/12* (2013.01); *Y10T 29/49009* (2015.01)

(58) Field of Classification Search
CPC .. H02K 1/00; H02K 1/06; H02K 1/12; H02K 1/145; H02K 1/18; H02K 1/182
USPC ..... 310/112, 145, 154.01, 216, 216.008, 257
See application file for complete search history.

(56) References Cited

U.S. PATENT DOCUMENTS

| | | | |
|---|---|---|---|
| 5,216,339 A | 6/1993 | Skybyk | |
| 2010/0033043 A1* | 2/2010 | Seki | .................. H02K 3/52 310/71 |
| 2010/0237822 A1* | 9/2010 | Hiramoto | ............ H02K 21/046 318/718 |
| 2011/0037335 A1 | 2/2011 | Jang et al. | |

(Continued)

FOREIGN PATENT DOCUMENTS

| | | |
|---|---|---|
| DE | 3142913 | 5/1983 |
| GB | 1364684 | 8/1974 |

(Continued)

OTHER PUBLICATIONS

Machine translation of JP 2009303378 A.*

*Primary Examiner* — John K Kim
*Assistant Examiner* — Minki Chang
(74) *Attorney, Agent, or Firm* — Pearne & Gordon LLP (57) ABSTRACT

Described is a stator for an axial flow electric machine comprising a toroidal core (2) made from ferromagnetic material and a plurality of windings (3) and teeth (4) angularly distributed on the core (2) in an alternating configuration. The teeth have, on at least one relative lateral surface, a shaped profile defining at least one gripping surface (12) such as to act in conjunction with a matrix of resin designed to stably press the teeth (4) on the core (2).

19 Claims, 6 Drawing Sheets

(56) References Cited

U.S. PATENT DOCUMENTS

| | | | |
|---|---|---|---|
| 2011/0221287 A1* | 9/2011 | Lucchi | H02K 3/24 310/54 |
| 2012/0161361 A1* | 6/2012 | Ghelardi | H02K 15/12 264/272.13 |
| 2012/0161554 A1* | 6/2012 | Ghelardi | H02K 5/20 310/54 |

FOREIGN PATENT DOCUMENTS

| | | | |
|---|---|---|---|
| JP | 2009303378 A | * 12/2009 | |
| WO | 2010070405 | 6/2010 | |

\* cited by examiner

STATOR OF AN AXIAL FLOW ELECTRIC MACHINE AND THE PROCESS FOR MAKING IT

This invention relates to a a stator of an axial flow electric machine and the process for making it.

It is known that axial flow electric machines have a specific architecture in which the windings and/or the permanent magnetic stators and rotors are positioned on respective parallel discs close to one another, separated by an air gap the thickness of which extends in the direction of the axis of rotation of the rotor. This architecture is therefore significantly different from that of radial flow motors.

There are two main architectures for this type of motor, a first of which comprises a single rotor interposed between two fixed stator discs, the other of which comprises the interposing of a fixed stator disc between two rotor discs.

Generally, the rotor of the axial flow electric machines are of the permanent magnets type whilst the stator comprises a ferromagnetic core with a toroidal shape on which numerous coils are fitted which link the rotor magnetic field.

In more detail, the coils are inserted between the same number of teeth made from ferromagnetic material which define the above-mentioned air gap with respect to the rotor and which, in conjunction with the ferromagnetic core, determine the stator stretch of the flow lines. In other words, the teeth extend from the toroidal core parallel to the axis of rotation of the rotor and the hollows in which the coils are positioned are defined between them.

Irrespective of the architecture selected, different methods for making the stator are currently known.

In a first solution the stator is firstly made by joining a succession of punched plates, defining the final shape of the body made from ferromagnetic material which already has the teeth and the hollows between them. The coils are then made by winding copper conductors by hand in the respective hollows.

Whilst on the one hand this system gives the stator a marked mechanical strength, it should be noted that there is the drawback of significant constructional complications due to the manual winding of the coils. This has a negative and serious affect on the production costs of the electric machine.

A second solution comprises cutting in half a smooth ferromagnetic core, with a toroidal shape, to obtain two half-rings, and then fitting on each half-ring the coils made previously. This solution, which can be made simply and inexpensively (the coils can be obtained by simplified industrial processes), does not use teeth made of ferromagnetic material. This results in a first drawback linked to a high dispersion of the flow which is not conveyed correctly, so these machines have poor performance levels. A third solution is known from Italian patent application No. RN2008A000062 by the same Applicant, and comprises inserting pre-assembled annular coils on the toroid divided in half, with interposition, between the coils, of teeth made from ferromagnetic material having suitable seats for also being fitted on the toroidal core. This solution has the advantage of a considerable mechanical hold of the teeth on the core. However, it should be noted that the clearance existing between slot and toroidal core, which is necessary to allow the teeth to be fitted simply on the toroidal core, introduces an air gap which increases the reluctance of the magnetic circuit, adversely affecting the performance of the electric machine.

A further solution is known from the patent publication No. GB1364684; this publication describes, whilst highlighting the defects, a process for constructing a stator of an axial flow machine wherein the teeth are made separately from the toroidal core and are fixed to it, after application of the coils, by gluing to the flat surface of the toroidal core.

However, the disadvantages of this solution are both electrical (the presence of the glue has a negative influence on the magnetic circuit, adversely affecting the performance of the electric machine) and mechanical (the mechanical strength of the teeth is limited to the hold of the glue which may not be sufficient to withstand the high magnetic forces which tend to pull the teeth from the toroidal core).

The aim of this invention is, therefore, to provide a stator for an axial flow electric machine and a process for making it which overcome the above-mentioned disadvantages of the prior art.

More specifically, the aim of this invention is to provide a stator for an axial flow electric machine with good performance levels, which has a high mechanical strength and, at the same time, is easy and inexpensive to make.

This invention also relates to a process for making the stator.

The aim is fully achieved by the stator according to this invention, as characterised in the appended claims.

More specifically, the stator according to the invention comprises a toroidal core having a receiving portion and a plurality of teeth initially separated by the core.

According to the disclosure, at least one of the teeth has, on at least one respective tangential surface facing towards the axis of the stator or on the side opposite, a shaped profile defining at least one gripping surface facing in the opposite direction to the toroidal core.

In other words, for at least one of the teeth, at least one of the tangential surfaces (i.e. faces) of the tooth (either the tangential face facing towards the axis of the stator or the tangential face facing away from the axis of the stator, or both) has a portion (a notch and/or a protrusion) defining a surface (that is, said gripping surface) facing away from to the toroidal core.

In addition, the stator comprises a resin matrix which coats and binds together the toroidal core and the teeth.

Preferably, the gripping surface is substantially parallel to the receiving surface of the toroidal core.

Preferably, a plurality of teeth has (more preferably, all the teeth have), on at least one of the tangential surfaces of the tooth, the shaped profile defining the at least one gripping surface.

Preferably, the at least one tooth equipped with the shaped profile, has the shaped profile (defining the at least one gripping surface) on both the relative tangential surfaces.

Preferably, the stator comprises an outer casing with an annular shape, enclosing externally the core and the teeth, and also coated with the resin matrix.

Once the resin matrix, gripping the core and the gripping surface of the tooth (or all the teeth, in the preferred configuration wherein all the teeth have at least one gripping surface), has hardened, it stably retains the tooth on the core, opposing the mechanical forces which during use tend to pull each tooth from the core.

Preferably, there are no elements interposed between the teeth and the core, in particular there are no layers of adhesive or other materials which would "soil" the magnetic circuit of the stator. More specifically, the teeth are rested directly on the core and then locked in position by the hardening of the resin. Preferably, the teeth are "simply" rested on the core, that is, the teeth are rested on the core without adhesive or other fixing means interposed between the teeth and the core surface; indeed, the teeth are subsequently locked in position by the hardening of the resin.

Preferably, the gripping surface is defined by a step.

In an embodiment, the gripping surface is defined by a protrusion of the tooth.

In another embodiment, the gripping surface is defined by a recess of the tooth.

The gripping surface is defined at least on a tangential surface of each tooth, facing towards the axis of the stator, or on a tangential surface of each tooth, facing in the opposite direction to the axis of the stator.

Preferably, the gripping surface is defined on all the teeth and even more preferably on both the above-mentioned tangential surfaces of the teeth. In this way, each tooth can be supported by the resin independently from the other teeth.

Preferably, the casing has at least one locking portion which can be engaged with the gripping surfaces to keep the teeth pressed against the toroidal core. The locking portion can be defined by a groove or by a circumferential protrusion, if the gripping surfaces on which it engages are defined by protrusions or recesses, respectively.

The teeth are angularly distributed around the axis to define, between two successive teeth, a respective hollow. In an embodiment, each winding is at least partly housed inside a respective hollow and is inserted on the toroidal core. To accomplish this, the core is divided into at least two portions, preferably two half-rings.

Figure 9:
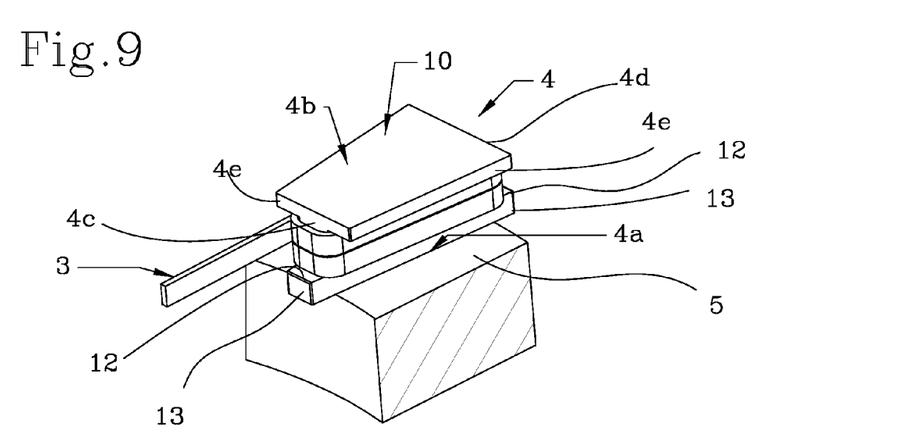
FIG. 9 shows a schematic perspective view of an example detail of a winding fitted on a tooth, in an embodiment of the invention.

In a different solution (shown in FIG. 9), each winding is inserted on a respective tooth which is in turn applied to the receiving surface of the core. In this solution the core can comprises a single piece, toroidal in shape, and the division into two or more parts is not required.

Each tooth also has a base wall resting on the toroidal core and a top wall opposite the base wall and defining, in conjunction with a corresponding rotor, an air gap. In an embodiment, the top wall has a flat outer surface parallel to the receiving surface of the toroidal core and laterally abutting the corresponding top walls of the adjacent teeth. Thus, there is an electric and magnetic continuity of the teeth, with flow lines which close on the end walls without passing through the rotor.

In a different embodiment, the flat outer surface of each tooth is laterally spaced from the corresponding top walls of the adjacent teeth to define a respective air gap.

This solution considerably reduces the flow which tends to close on the top walls of the teeth, however in this configuration it is possible to use a fixing ring made of ferromagnetic material, superposing the top walls of the teeth and rigidly connected to the top portions to establish an electric and magnetic continuity between the teeth.

In an embodiment, the toroidal core has two receiving surfaces with an annular shape, opposite one another and substantially perpendicular to the axis of the stator, each or which receives a respective series of teeth and windings.

In a different embodiment, the core has a single receiving surface.

Moreover, in an embodiment the electrical machine according to the invention is an electric motor.

In a different embodiment, the electrical machine according to the invention is an electricity generator.

With reference to the process according to the invention, it is characterised in that the teeth are simply rested on the receiving surface of the toroidal core and, subsequently, the core and the teeth are impregnated/coated with the resin matrix to stably press the teeth on the core.

Preferably, between the step of applying the teeth on the core and the step of impregnating with the resin matrix there is a step of clamping the teeth on the core (preferably by inserting the core and the teeth coupled thereon in a suitably configured mould). This clamping step is also maintained during at least a part of the step of impregnating with the resin. The process also comprises, before the impregnation step, the application to the core of a plurality of windings which are also impregnated with the resin. At the moment of application to the core, the windings are already made.

In an embodiment, the windings are applied directly to the core before application of the teeth, in particular they are fitted on the core and spaced in such a way as to leave free, between each pair of windings, a portion of the receiving surface for the successive application of a tooth. For this reason, the core is initially divided into two parts, for example cut along one or more planes passing through the axis of the stator, or several pieces of the core can be prepared, already made according to an angular extension less than an entire toroid.

In a different embodiment, the core is prepared initially already with a toroidal shape and it is not cut, whilst the application of the teeth on the core and application of the windings on the core are performed by fitting each winding on a respective tooth and successively applying the tooth on the core by resting the base wall of the tooth on the receiving surface of the core.

Before the step of applying the teeth to the core, or after it, there can be a step of joining together at least one sub-set of teeth by fixing the top wall of the teeth to a fixing ring made of ferromagnetic material.

The technical features of the invention according to the above mentioned aim are clearly described in the claims below and its advantages are apparent from the detailed description which follows, with reference to the accompanying drawings, which illustrate a preferred non-limiting example embodiment of the invention and in which:

Figure 1:
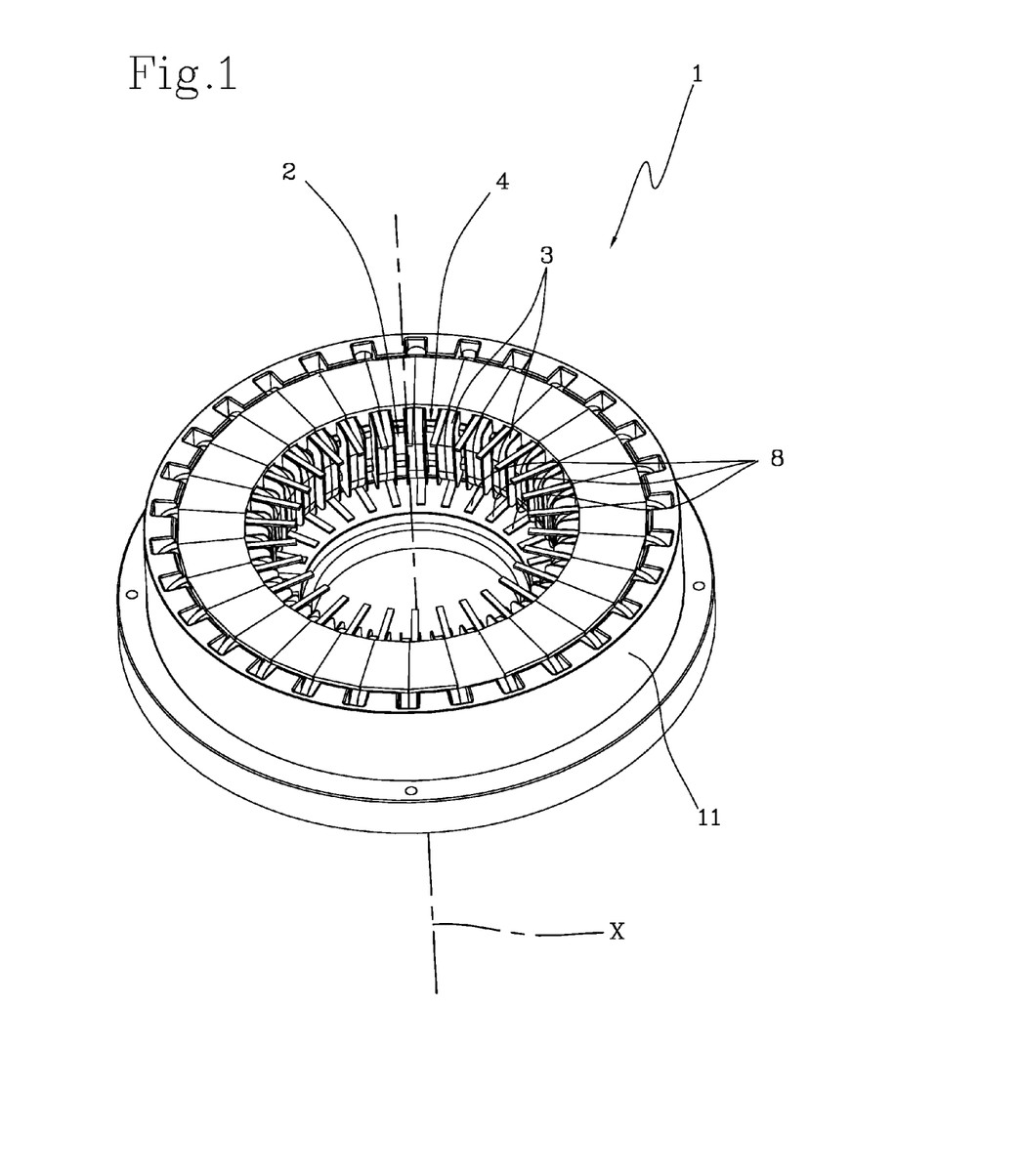
FIG. 1 shows a stator for an axial flow electric machine according to this invention.
Figure 2:
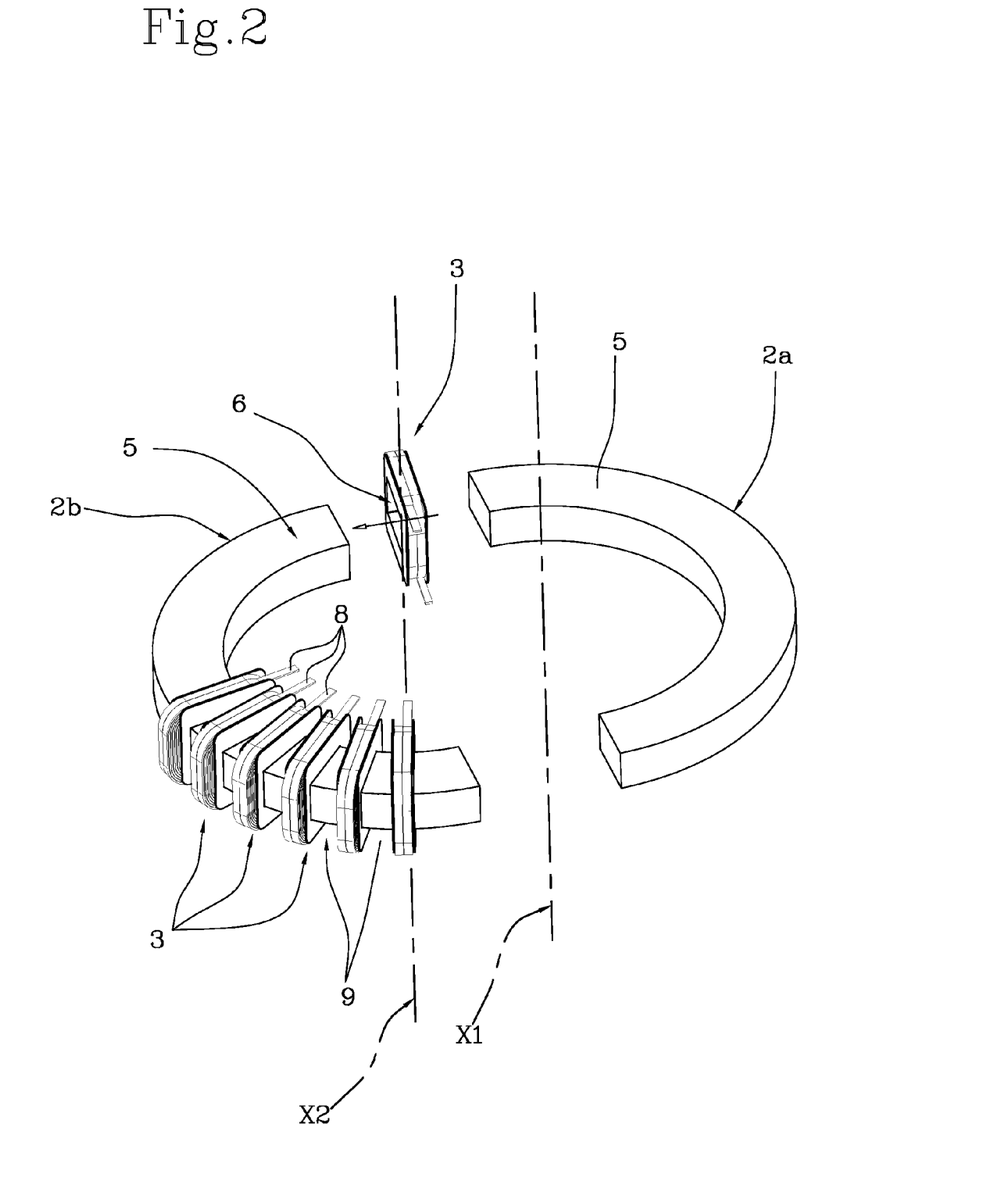
FIGS. 2 and 3 show two successive steps of making the stator of FIG. 1.

With reference to FIG. 1, the numeral 1 denotes in its entirety a stator for an axial flow electric machine according to a preferred embodiment of this invention.

In the field of this invention, the term "electric machine" can apply indistinctly to an electric motor and an electricity generator.

The stator 1 basically comprises a toroidal core 2 (shown more clearly in FIG. 3) made from a ferromagnetic material, a plurality of windings 3 or reels of conducting wire, and a plurality of teeth 4 also made from ferromagnetic material.

The toroidal core 2 extends along a circular line about an axis "X", which coincides with the axis of rotation of the rotors (of known type and therefore not illustrated) associated with the stator 1.

The core 2 also has at least one receiving surface 5 which is annular in shape, also extending about an axis "X". Preferably, the receiving surface 5 is flat and perpendicular to the axis "X".

Even more preferably, the receiving surface 5 is smooth.

In a preferred embodiment, as shown in the drawings, the core 2 has two receiving surfaces 5 with an annular shape, opposite one another.

On the core 2 are mounted the windings 3 which, more specifically, are fitted on the core 2. In other words, each winding 3 is obtained by making a plurality of coils, parallel to each other, of a metallic conductor, to form a final structure with an annular shape. Each winding 3 also has an insulating support 7 about which the coils are arranged and forming a central opening 6 substantially shaped to match the transversal cross-section of the toroidal core 2.

To allow the fitting of the windings (which are made in advance), the toroidal core 2 is divided into two half-rings 2a, 2b preferably identical to each other, each of which extend on a circular line about a respective axis "X1", "X2" for a partial extension of the line. The two half-rings 2a, 2b are such as to form the toroidal core 2 once the fitting of the windings 3 has been completed.

Each winding 3 also has a pair of connection terminals 8 in such a way that, after the stator 1 has been made, the windings 3 can be connected in the desired manner to a power supply terminal strip.

The windings 3 are therefore fitted on the core 2 in such a way that the coils are linked with the circular line of extension of the core 2, and therefore linked with the magnetic flow passing through the core 2 (and through the teeth 4, as described in more detail below). In other words, the windings 3 have the coils arranged according to a substantially radial direction, that is, substantially passing through the axis "X" of the toroidal core 2.

The windings 3 are positioned on the core 2 angularly equidistant about the axis "X" and define, between them, respective seats 9 for fitting the teeth 4.

The teeth 4 are alternated with the windings 3 and applied on the receiving surfaces 5 of the core 2.

Figure 4:
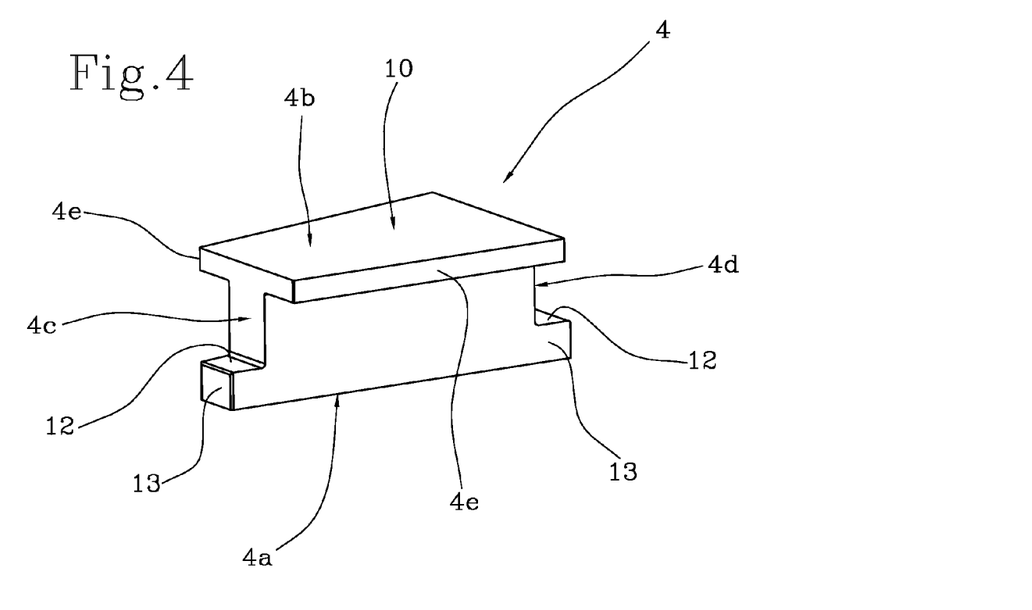
FIGS. 4 and 5 show two different views of a detail (tooth) of the stator of FIG. 1.
Figure 5:
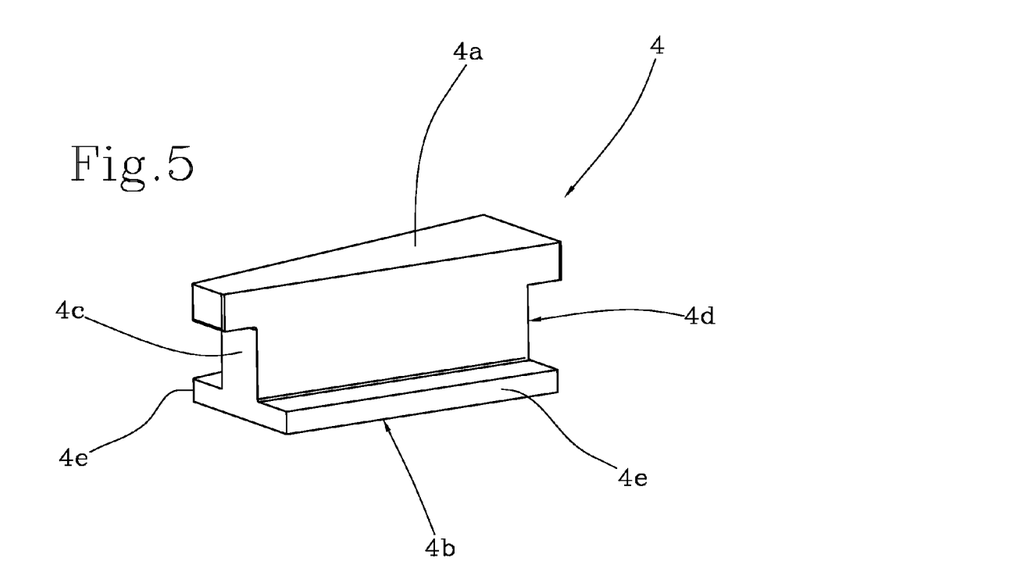

In greater detail, as shown in FIGS. 4 and 5, each tooth 4 has:

a base wall 4a, designed to be rested on the receiving surface 5 of the core 2;

a top wall 4b, opposite the base wall 4a;

a first and a second tangential surface 4c, 4d, respectively internal (facing towards the axis "X") and external (opposite the internal one), between the above-mentioned base wall 4a and top wall 4b.

The teeth 4 are made, for example, by sintering, or they are made from laminated materials. In any event, the teeth 4 have ferromagnetic properties.

The top wall 4b has a flat outer surface 10 parallel to the receiving surface 5 of the core 2 and designed to face the air gap defined in conjunction with the rotor (not illustrated).

The teeth 4 are positioned on the receiving surface 5 of the core 2 by resting on the above-mentioned base wall 4a and extend away from the receiving surface 5 along the axis "X".

More specifically, the above-mentioned plurality of teeth 4 is divided into a first and a second series of teeth applied, respectively, to a first receiving surface 5 and to the other receiving surface 5 and extending away from the respective receiving surface 5 along the axis "X".

Preferably, the stator 1 also comprises an outer casing 11 with an annular shape, shaped to encompass the outer periphery of the core 2 and the teeth 4, in particular the second tangential surfaces 4d of the teeth 4, in such a way as to compact the overall structure of the stator 1.

Advantageously, at least one of the teeth 4, preferably a sub-set of the above-mentioned plurality of teeth 4 and yet more preferably each of the teeth 4, has, on at least one of the two tangential surfaces 4c, 4d, a shaped profile forming at least one gripping surface 12 substantially parallel to the receiving surface 5 of the toroidal core 2 and facing in the opposite direction to the toroidal core 2 when the tooth 4 is applied to the core 2.

Preferably, the gripping surface 12 is defined by a step 13 preferably forming a right angle, that is to say, comprising two surfaces perpendicular to each other, in particular a first surface parallel to the tangential surface 4c, 4d and a second surface parallel to the receiving surface 5.

In an embodiment, shown in FIGS. 4 and 5, the gripping surface 12 is defined by a protrusion which projects from the above-mentioned tangential surface 4c, 4d.

However, in a different embodiment, the gripping surface 12 can also be defined by a cavity or recess made in the tangential surface 4c, 4d. This solution is shown by way of an example in FIG. 7 (in combination with another characteristics, which will be referred to below).

Preferably, the gripping surface 12 is defined both on the first and on the second tangential surfaces 4a, 4b, as shown in FIGS. 1-5.

However, in accordance with an embodiment not illustrated, the gripping surface 12 could be defined only on the first or only on the second tangential surfaces 4a, 4b.

Advantageously, at least the core 2 and the teeth 4, and preferably also the casing 11, are engaged by a resin matrix 15 which stabilises the various components of the stator 1 in a stable position.

The resin, gripping the gripping surfaces 12, locks in a stable fashion the teeth 4 on the core 2. This allows the teeth 4 to be initially applied to the core 2 by simply resting the base wall 4a of the teeth 4 on the receiving surface 5 without using adhesive substances which would adversely affect the overall reluctance of the stator magnetic circuit.

Preferably, the resin is applied by injection or by casting in a mould.

Preferably, the casing 11 has at least one locking portion (not illustrated) which can be engaged with the gripping surfaces 12 made on the second tangential surface 4d of the teeth 4.

Preferably, in this configuration the locking portion extends circumferentially along an entire angular extension around the axis "X" and can engage with the gripping surfaces 12 of the teeth 4 for holding the teeth 4 pressed against the receiving portion 5 of the toroidal core 2.

Figure 6:
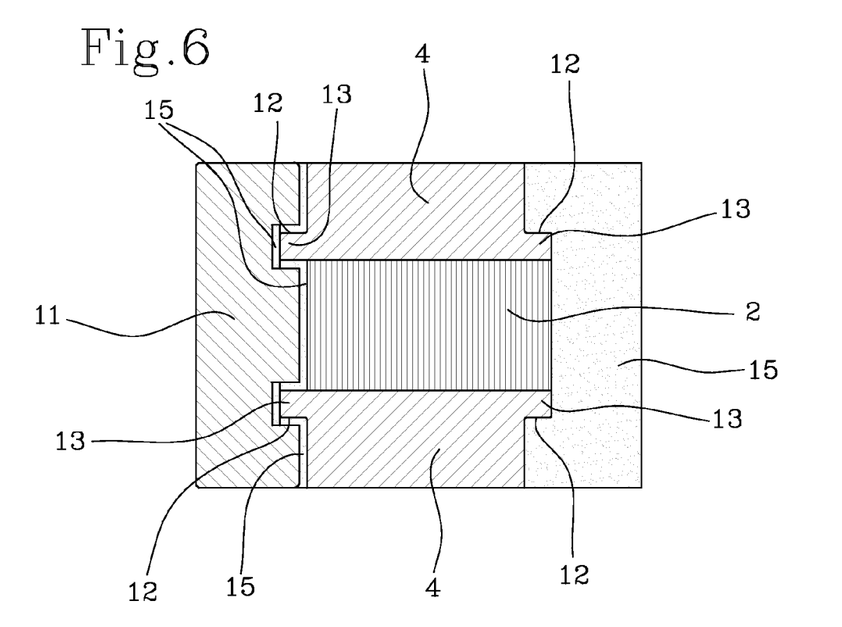
FIG. 6 shows the stator of FIG. 1 in a cross section through a plane containing the axis X of FIG. 1 and intersecting the tooth in the figure.

If the gripping surfaces 12 are present on the second tangential surface 4d of the teeth 4 and they are defined by protrusions 13 (FIGS. 4 and 5), the locking portion of the casing 1 can be advantageously defined by a throat extending along the entire circumferential extension of the casing 1 and inside which the protrusions 13 of the teeth 4 can be inserted (FIG. 6).

Figure 7:
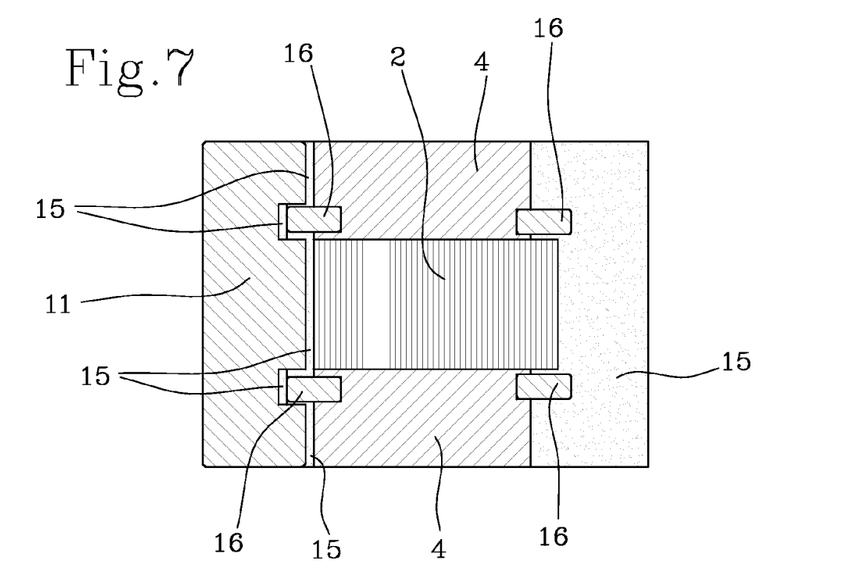
FIG. 7 shows the stator of FIG. 6 according to a variant embodiment.

In the different case in which the gripping surfaces 12 are present on the second tangential surface 4d of the teeth 4 and they are defined by cavities or recesses, the locking portion can be advantageously defined by a protrusion extending along the entire circumferential extension of the casing 1 and which can be inserted in the cavities or recesses of the teeth (according to a variant not illustrated); alternatively, to the protrusion defined by the casing, the locking portion can comprise coils 16 (for example, made of steel) inserted between the cavities or recesses of the teeth 4 and a corresponding throat defined by the casing 11 (this embodiment is shown in FIG. 7).

In both cases, the casing 11 keeps the teeth 4 pressed on the core 2 assisting the locking effect exerted by the resin matrix.

The resin is usually an epoxy resin with insulating properties, preferably with mechanical and/or thermal conductivity properties.

As described above, the windings 3 are positioned on the core 2 angularly equidistant about the axis "X" and define, between them, respective seats 9 for inserting the teeth 4.

Figure 3:
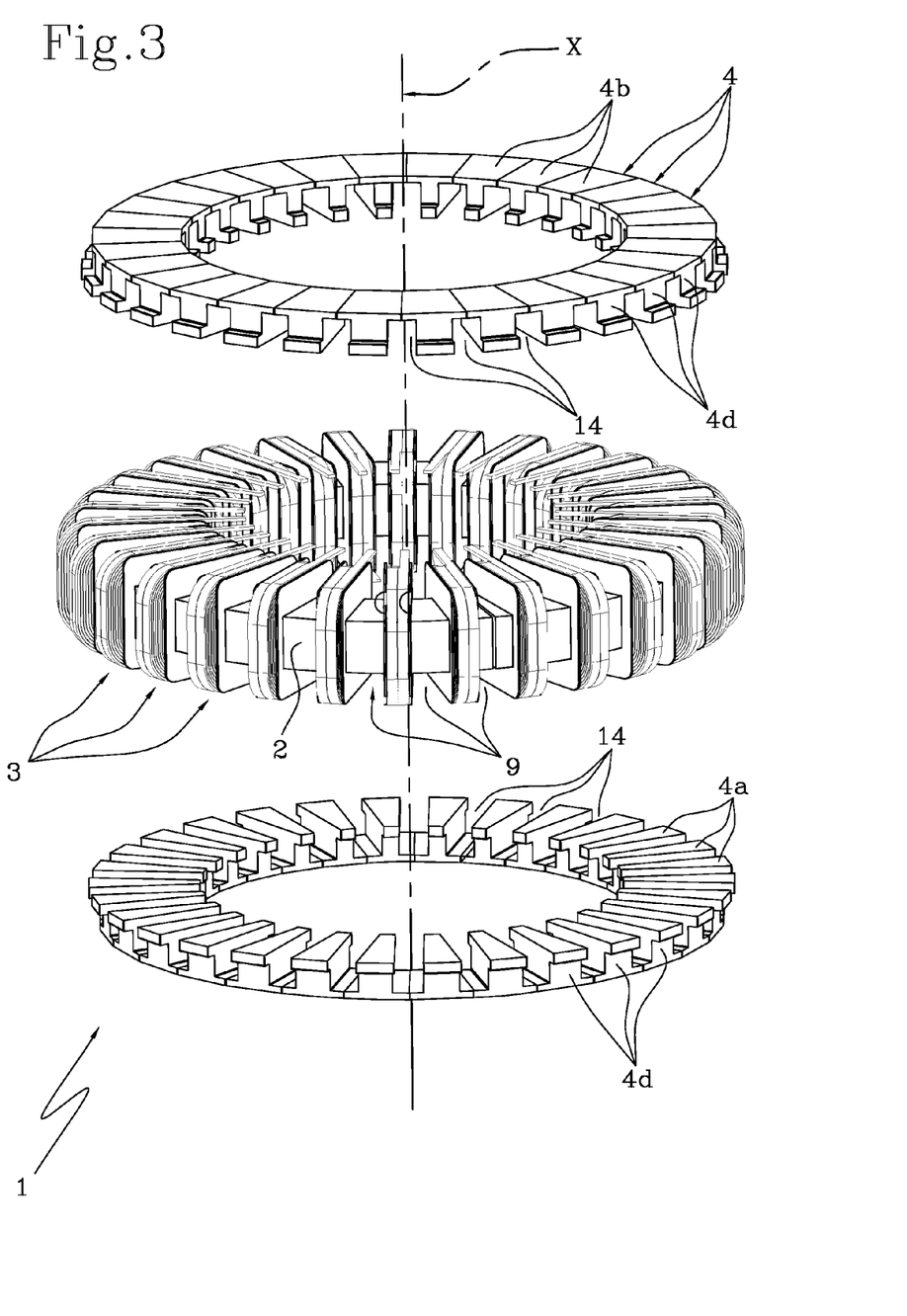

As shown in FIG. 3, the teeth 4 are also positioned on the core 2 angularly equidistant about the axis "X" and define, between two successive teeth 4, a respective hollow 14 for housing a respective winding 3.

As shown in FIGS. 1 and 3 to 5, the top wall 4b of each tooth 4 has a transversal cross-section larger than the remaining part of the tooth 4 (in particular with respect to the central part defining the tangential surfaces 4c, 4d) which give the tooth 4 a "mushroom" shape.

Preferably, when the teeth 4 are applied to the core 4, the top wall 4b laterally abuts the corresponding top walls 4b of the adjacent teeth 4. In other words, the top walls 4b of the teeth 4 have lateral edges 4e converging towards the axis "X" (which give the flat outer surface a substantially trapezoidal shape) and designed to enter into contact with the corresponding lateral edges 4e of the adjacent teeth 4.

Preferably, once the casing 11 has been applied, it presses the teeth 4 towards the axis "X" promoting the mutual pressing of the top walls 4b of the teeth 4.

In this pressed configuration, the hollows 14 are closed (below by the core 2, laterally and above by the teeth 4) and therefore allow a dispersed flow which does not abandon the stator and does not, therefore, interact with the rotor to generate mechanical power. This configuration is particularly useful for making the flow of the electric machine.

Figure 8:
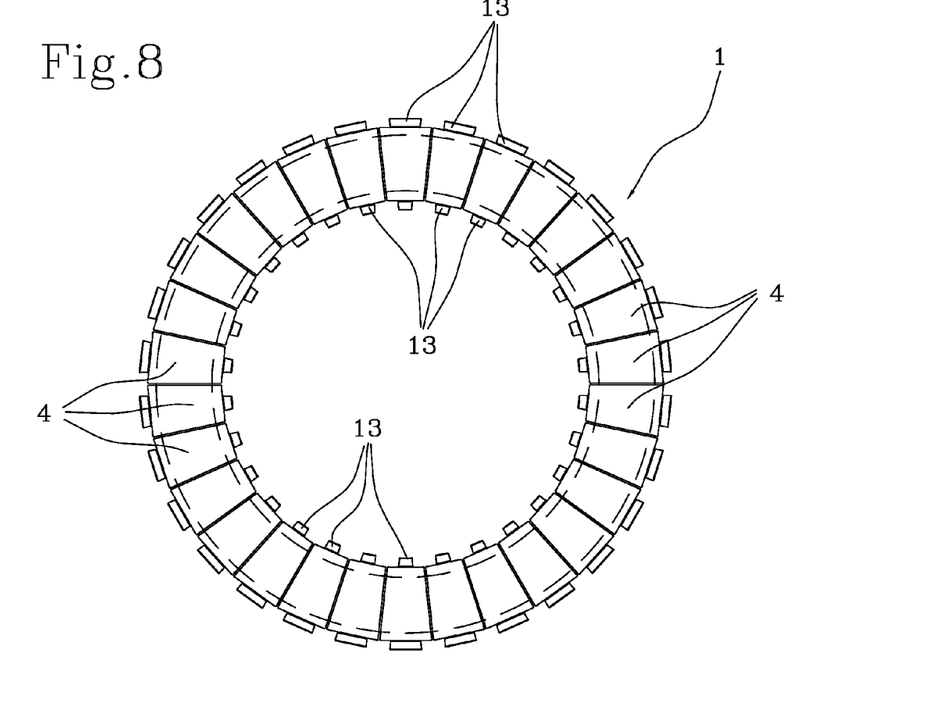
FIG. 8 shows a plan view of the stator of FIG. 1 according to a variant embodiment.

In a different embodiment (shown in FIG. 8), the top wall 4b is laterally spaced from the corresponding top walls 4b of the adjacent teeth 4 to define a respective air gap. In this embodiment, the stator 1 can also comprise at least one fixing ring made of ferromagnetic material (shown with a dashed line in FIG. 8), superposing the top walls of the teeth and rigidly connected to them to establish an electric and magnetic continuity between the teeth, overcoming the fact that the lateral edges of the top walls of adjacent teeth are not in contact.

Preferably, but not necessarily, such a fixing ring can be used in an embodiment of the type shown in FIGS. 1 to 5 where, however, not all the teeth 4 are provided with gripping surfaces 12. The use of the fixing ring could in effect allow teeth not provided with gripping surfaces 12 to be kept in position on the core thanks to the action of the fixing ring which makes the teeth 4 integral with each other.

In a different embodiment not illustrated, the windings are not fitted on the core but are fitted on the teeth, in particular on the shank portion of the teeth. In other words, the winding coils lie on planes parallel to the position of the toroidal core and perpendicular to the axis about which the core extends. In this configuration, the toroidal core can be kept whole without being divided into two half-rings. Despite this, the locking of the teeth on the core can take place in the way described previously, by impregnating the core and the teeth (and preferably also the casing) with the resin matrix which, by gripping the gripping surfaces, keeps the teeth stably on the core.

Described below is a process for making the stator 1 according to this invention.

The method comprises the steps of:

preparing the core 2 made of ferromagnetic material, which extends along a circular line (in particular, along a stretch of it in the case of half-rings 2a, 2b) and has at least one receiving surface 5 lying on the circular line;

preparing a plurality of teeth 4 having the configuration described above and, in particular, at least one gripping surface 12;

preparing a plurality of windings 3;

applying teeth 4 on the core 2 in such a way that the base wall 4a of each tooth 4 is simply resting on the receiving surface 5, in particular without the use of adhesive substances interposed in the interface between core 2 and teeth 4;

applying windings 3 on the core 2 in such a way that the windings 3 operate in conjunction with the core 2 and with the teeth 4 for linking with a magnetic flow passing through the core 2 and the teeth 4;

impregnating the core 2 and the teeth 4 with a resin matrix in such a way that the resin, gripping the gripping surfaces 12, holds each tooth 4 on the core 2.

Preferably, the process also comprises a step of applying, outside the toroidal core 2 and the relative windings 3 and teeth 4, the outer casing 11. The application of the casing 11 allows the relative locking portion to act on the gripping portions 12 of the teeth 4 keeping the teeth 4 pressed on the core 2.

Before the step of impregnating with the resin matrix binder there is a step of clamping the teeth 4 on the core 2.

The clamping step includes inserting the set comprising the core, teeth and casing in a mould (not illustrated). The mould is configured for exerting a pressure on the two opposite faces of the stator (that is, the mould presses on the teeth).

Moreover, the mould is configured for receiving (for example, by injection) an impregnating resin.

In the case of applying windings 3 to be inserted on the core 2 (embodiment shown in the drawings), the core 2 is set up in a configuration divided into two half-rings 2, 3 made of ferromagnetic material, on each of which the respective windings 3 are subsequently inserted and a respective series of teeth 4 are applied.

In order to allow the application of the teeth 4, the windings 3 are arranged in a mutually equidistant position in such a way as to leave uncovered adequate portions of the receiving surface 5 comprised between them.

After the application of the windings 3 (and preferably before the application of the teeth 4) the two half-rings 2a, 2b are joined together to restore the complete toroidal shape of the core 2.

In the solution with windings inserted on the teeth, the teeth are applied to the core (as a whole, not necessarily divided into half-rings) with the windings already inserted on them.

It is possible that, in this step, some teeth are not fitted with windings. This is characteristic of the stators equipped with teeth with windings and teeth without windings, alternating with each other to define a particular magnetic circuit.

In an embodiment compatible with both the solutions described above (windings 3 fitted on the core 2 or windings 3 fitted on the teeth 4), the step of applying the teeth 4 on the core 2 is preceded by a step of joining together at least one sub-set of the teeth 4 (for example, for each half-ring 2a, 2b all the teeth 4 or part of the teeth 4 associated with it) by fixing the top wall 4b of the teeth 4 to the fixing ring made of ferromagnetic material. Alternatively, the application using the fixing ring on the teeth 4 can occur after the positioning of the teeth 4 on the core 2.

This invention is aimed at a stator having two series of teeth positioned on sides axially opposite each other. This solution is suitable for use on axial machines equipped with a central stator and two rotors coaxial with the stator and positioned on the two sides of the stator. In general, the rotors are of the type with surface permanent magnets, facing towards the stator. However, the inventive concept of the invention is also applicable to stators equipped with a single series of teeth, that is to say, on one side only. This latter configuration is suitable for use in motors having a single rotor, for example a central rotor coupled to two stators coaxial with it and opposite to each other.

The invention achieves the preset aim for the following reasons.

The architecture of the stator with teeth simply resting and with the resin matrix which binds together core and teeth allows high levels of robustness and mechanical strength to be obtained (for example against the mechanical forces induced on the teeth by the magnetic interactions with the rotor) with respect to a reduced resulting reluctance of the magnetic circuit, which is not "soiled" by the presence of adhesive substances between core and teeth.

The invention described above is susceptible of industrial application and may be modified and adapted in several ways without thereby departing from the scope of the inventive concept. Moreover, all the details of the invention may be substituted for technically equivalent elements.

The invention claimed is:

1. A stator of an axial flow electric machine, comprising: a toroidal core (2) extending around an axis (X) and comprising at least one annular receiving surface (5); a plurality of teeth (4), positioned in contact on the receiving surface (5) and extending away from the receiving surface (5) along said axis (X), each of the teeth (4) comprising a first tangential surface (4c) facing towards the axis (X) and a second tangential surface (4d) which is opposite to the first tangential surface (4c); a plurality of windings (3), angularly distributed around the axis (X) and operating in conjunction with the core (2) and the teeth (4) for linking a magnetic flow passing through the core (2) and the teeth (4), wherein at least one of the teeth (4) comprises, on at least one of the tangential surfaces (4c, 4d), a shaped profile forming at least one gripping surface (12) facing in the opposite direction to the toroidal core (2), and wherein the stator (1) comprises a resin matrix binding together at least the toroidal core (2) and the teeth (4), wherein the resin matrix engages together said gripping surface (12) and the core (2) to retain the tooth on the core.

2. The stator according to claim 1, wherein said gripping surface (12) is formed by a step (13) of the shaped profile.

3. The stator according to claim 1, wherein said gripping surface (12) is substantially parallel with the receiving surface (5) of the toroidal core (2).

4. The stator according to claim 1, wherein said gripping surface (12) is formed at least on the first tangential surface (4c) of said at least one tooth (4).

5. The stator according to claim 1, wherein the at least one gripping surface (12) is formed by each of the teeth (4).

6. The stator according to claim 1, wherein said gripping surface (12) is formed at least on the second tangential surface (4d) of said at least one tooth (4), and wherein the stator (1) comprises at outer casing (11) shaped to encompass the second tangential surfaces (4d) of the teeth (4) and comprising at least one locking portion which can engage with said gripping surface (12) for holding the tooth (4) pressed against the toroidal core (2).

7. The stator according to claim 6, wherein said at least one gripping surface (12) is formed by each of the teeth (4) and wherein said locking portion of the casing (11) extends circumferentially along the entire angular extension around the axis (X) and can engage with said gripping surfaces (12) of the teeth (4) for holding the teeth (4) pressed against the toroidal core (2).

8. The stator according to claim 1, wherein the teeth (4) are angularly distributed around the axis (X) to form, between two teeth (X) placed one after another, a respective hollow (14), and wherein each of the windings (3) is at least partly housed in one of the hollows (14) and fitted on the toroidal core (2).

9. The stator according to claim 1, wherein each of the windings (3) is fitted on a respective tooth (4).

10. The stator according to claim 1, wherein each tooth (4) also comprises a base wall (4a) resting on the receiving surface (5) of the toroidal core (2) and a top wall (4b) opposite to the base wall (4a), wherein said top wall (4b) comprises a flat outer surface (10) parallel with the receiving surface (5) of the toroidal core (2) and laterally abutting the corresponding top walls (4b) of the adjacent teeth (4).

11. The stator according to claim 1, wherein each tooth (4) also comprises a base wall (4a) resting on the receiving surface (5) of the toroidal core (2) and a top wall (4b) opposite to the base wall (4a), wherein said top wall (4b) comprises a flat outer surface (10) parallel with the receiving surface (5) of the toroidal core (2) and which is laterally distanced from the corresponding top walls (4b) of the adjacent teeth (4) to form a respective air gap, said stator (1) also comprising at least one fixing ring made of ferromagnetic material, rigidly connected to the top walls (4b) of the teeth (4) for establishing electric and magnetic continuity between the teeth (4).

12. The stator according to claim 1, wherein the toroidal core (2) comprises a first and a second annular receiving surface (5), which are opposite one another and substantially perpendicular to the axis (X), and wherein the plurality of teeth (4) is divided into a first set of teeth (4) which are applied to the first receiving surface (5) and extend away from the first receiving surface (5) along the axis (X), and a second set of teeth (4) which are applied to the second receiving surface (5) and extend away from the second receiving surface (5) along the axis (X), at least one tooth (4) in each set comprising said gripping surface (12).

13. An axial flow electric machine comprising a stator (1) according to claim 1.

14. A method for making a stator for an axial flow electric machine, comprising the following steps: preparing a core (2) made of ferromagnetic material and extending along a circular line, comprising at least one receiving surface (5) lying on said circular line; preparing a plurality of teeth (4) made of ferromagnetic material, each tooth (4) comprising a base wall (4a) which can engage with the receiving surface (5), a top wall (4b) opposite to the base wall (4a) and at least two tangential walls (4c, 4d) which are opposite to one another and are located between the base wall (4a) and the top wall (4b), and wherein each one of the teeth (4) comprises, on at least one of the tangential surfaces (4c, 4d), a shaped profile forming at least one gripping surface (12) facing in the opposite direction to the base wall (4a); preparing a plurality of windings (3); applying teeth (4) on the core (2) in such a way that the base wall (4a) of each tooth (4) is resting on the receiving surface (5); applying windings (3) on the core (2) in such a way that the windings (3) operate in conjunction with the core (2) and with the teeth (4) for linking with a magnetic flow passing through the core (2) and the teeth (4); after applying the teeth (4) on the core (2), impregnating the core (2) and the teeth (4) with a resin matrix in such a way that the resin sticks on the gripping surface (12), holding the tooth (4) on the core (2).

15. The method according to claim 14, wherein between the step of applying the teeth (4) on the core (2) and the step of impregnating with the resin matrix there is a step of clamping the teeth (4) on the core (2) by inserting the core (2) and the teeth (4) applied on it in a mould.

16. The method according to claim 14, wherein the step of preparing the ferromagnetic core (2) is carried out by preparing two half-rings (2a, 2b) made of ferromagnetic material and wherein said step of applying the windings (3) is performed by fitting the windings (3) on the respective half-ring (2a, 2b), the step of applying the windings (3) being carried out before the step of applying the teeth (4) on the half-rings (2a, 2b); said method also comprising a step of joining together the half-rings (2a, 2b) to recover the whole toroidal core (2).

17. The method according to claim 14, wherein the step of preparing the core (2) is carried out by preparing a single toroidal core (2) made of ferromagnetic material and wherein the steps of applying the teeth (4) on the core (2) and applying the windings (3) on the core (2) are performed by fitting each winding (3) on a respective tooth (4), then applying the tooth (4) on the core (2) by resting the base wall (4a) of the tooth (4) on the receiving surface (5) of the core (2).

18. The method according to claim 14, wherein the step of applying the teeth (4) on the core (2) is preceded by a step of joining together at least one sub-set of said teeth (4) by fixing the top wall (4b) of said teeth (4) to a fixing ring made of ferromagnetic material.

19. The method according to claim 14, comprising a step of externally coupling to the toroidal core (2), to the teeth (4) and to the windings (3) an annular casing (11), said casing (11) comprising at least one locking portion which can engage with the gripping surface (12) of said at least one tooth (4) for holding the tooth (4) pressed against the toroidal core (2).

\* \* \* \* \*